United States Patent
Yang et al.

(10) Patent No.: US 11,858,836 B2
(45) Date of Patent: Jan. 2, 2024

(54) SLUDGE COMPOSITE CONDITIONER BASED ON IRON-CONTAINING SLUDGE PYROLYSIS RESIDUE AS WELL AS PREPARATION METHOD AND USE THEREOF

(71) Applicant: Huazhong University of Science and Technology, Hubei (CN)

(72) Inventors: Jiakuan Yang, Hubei (CN); Shuangyi Tao, Hubei (CN); Sha Liang, Hubei (CN); Keke Xiao, Hubei (CN); Wenbo Yu, Hubei (CN); Jingjing Qiu, Hubei (CN); Quan Gan, Hubei (CN); Ruonan Guan, Hubei (CN); Huijie Hou, Hubei (CN); Bingchuan Liu, Hubei (CN); Jingping Hu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 944 days.

(21) Appl. No.: 16/446,037

(22) Filed: Jun. 19, 2019

(65) Prior Publication Data
US 2019/0315645 A1 Oct. 17, 2019

Related U.S. Application Data

(63) Continuation-in-part of application No. PCT/CN2017/107012, filed on Oct. 20, 2017.

(30) Foreign Application Priority Data

Sep. 18, 2017 (CN) .......................... 201710840853.X

(51) Int. Cl.
C02F 11/14 (2019.01)
C02F 11/143 (2019.01)
(Continued)

(52) U.S. Cl.
CPC ............ *C02F 11/143* (2019.01); *C02F 11/06* (2013.01); *C02F 11/10* (2013.01);
(Continued)

(58) Field of Classification Search
CPC ......... C02F 11/06; C02F 11/10; C02F 11/143; C02F 2209/02; C02F 2209/06;
(Continued)

(56) References Cited

U.S. PATENT DOCUMENTS

2013/0203144 A1* 8/2013 Josse ....................... C02F 11/10
435/167

FOREIGN PATENT DOCUMENTS

| CN | 101081716 A | 12/2007 |
|---|---|---|
| CN | 102020384 A | 4/2011 |

(Continued)

OTHER PUBLICATIONS

Song et al., Role of oxidants in enhancing dewaterability of anaerobically digested sludge through Fe (II) activated oxidation processes: hydrogen peroxide versus persulfate, 6 Sci. Rep., 1, 1-9 (2016). (Year: 2016).*

(Continued)

*Primary Examiner* — Chester T Barry
(74) *Attorney, Agent, or Firm* — HAMRE, SCHUMANN, MUELLER & LARSON, P.C.

(57) ABSTRACT

The present disclosure discloses a sludge composite conditioner based on iron-containing sludge pyrolysis residue as well as a preparation method and use thereof. The sludge composite conditioner comprises iron-containing sludge pyrolysis residue and an oxidant used in combination with the iron-containing sludge pyrolysis residue, in which the iron-containing sludge pyrolysis residue is pyrolysis residue obtained by dewatering iron-containing sludge to obtain an iron-containing sludge cake and then pyrolyzing the iron- (Continued)

ACCOMPANYING FIGURES containing sludge cake, the iron-containing sludge being obtained from an advanced oxidation technology involving an iron-containing reagent. In the present disclosure, through improvements of the subsequent overall treatment process, the reuse mode and specific reaction condition parameters of the respective subsequent treatment process steps of the iron-containing sludge cake, the problem of sludge cake treatment and disposal at the end of the existing sludge treatment and disposal technology can be effectively solved compared with the prior art, and then the iron-containing sludge cake is utilized to form a composite conditioner for deep dewatering of sludge, which is recycled as a sludge conditioner for sludge treatment, thereby realizing the full utilization of resources.

8 Claims, 2 Drawing Sheets

(51) Int. Cl.
*C02F 11/06* (2006.01)
*C02F 11/10* (2006.01)
(52) U.S. Cl.
CPC ...... *C02F 2209/02* (2013.01); *C02F 2209/38* (2013.01); *C02F 2305/023* (2013.01); *C02F 2305/026* (2013.01)

(58) Field of Classification Search
CPC ............ C02F 2209/38; C02F 2305/023; C02F 2305/026; Y02W 10/40
See application file for complete search history.

(56) References Cited

FOREIGN PATENT DOCUMENTS

| | | | | |
|---|---|---|---|---|
| CN | 102381828 | A | 3/2012 | |
| CN | 102745879 | A | 10/2012 | |
| CN | 103007937 | A | 4/2013 | |
| CN | 105384399 | A | 3/2016 | |
| CN | 105859105 | A * | 8/2016 | ............ B01J 23/002 |
| CN | 105859105 | A | 8/2016 | |
| CN | 106219941 | A | 12/2016 | |
| CN | 107033918 | A | 8/2017 | |
| EP | 1985590 | A1 | 10/2008 | |
| JP | 2001129405 | A | 5/2001 | |

OTHER PUBLICATIONS

Wu et al., Possibility of sludge conditioning and dewatering with rice husk biochar modified by ferric chloride, 205 Bioresouce Technol., 258, 258-263 (2016). (Year: 2016).*
International Search Report (English and Chinese) issued in PCT/CN2017/107012, dated May 31, 2018, 10 pages provided.

* cited by examiner

ACCOMPANYING FIGURES

SLUDGE COMPOSITE CONDITIONER BASED ON IRON-CONTAINING SLUDGE PYROLYSIS RESIDUE AS WELL AS PREPARATION METHOD AND USE THEREOF

BACKGROUND

Technical Field

The disclosure belongs to the technical field of sewage sludge treatment, and more particularly relates to a sludge composite conditioner based on iron-containing sludge pyrolysis residue as well as a preparation method and use thereof, in which the sludge composite conditioner is obtained by recycling the pyrolysis residue of the iron-containing sludge, and can be used as an advanced oxidation composite conditioner for deep dewatering of sludge, belonging to a resource recycling method for iron-containing sludge.

Description of the Related Art

The so-called sludge is a general term for various types of sediments, floating objects, etc. produced in different treatment processes in the urban sewage and industrial sewage treatment. The sludge mainly includes various pathogens, oxygen-consuming pollutants, plant nutrients, toxic carcinogenic pollutants, general organic substances, inorganic pollutants such as acids, alkalis and salts, and the like. The sludge has strong hydrophilicity and large specific surface area due to high organic matter, resulting in difficulty in separation of sludge and water. At present, 83% of sludge in the urban sewage treatment plants in China has not been effectively disposed. Difficulty in dewatering and low mechanical dewatering efficiency has seriously affected the subsequent sludge disposal process. Therefore, sludge dewatering is a technical bottleneck that limits sludge treatment and disposal.

The current mainstream method of sludge conditioning is chemical conditioning. For example, Chinese Patent Application CN102381828A discloses a Fenton or Fenton-like method, in which the organic flocs of sludge are destroyed, and after mechanical expression, a deeply dewatered cake with a moisture content of less than 60% is obtained. The Fenton reagent advanced oxidation technology can effectively degrade organic matter by generating strong oxidizing groups such as hydroxyl radicals, and is widely used in wastewater treatment and sludge conditioning (such as in the treatment of process wastewater containing refractory organics), for example, in the treatment of organic wastewater in Chinese Patent Application CN102020384A. Although the Fenton reagent advanced oxidation technology is very effective, the ferrous salt added as a reactant precipitates in the form of iron sludge after the reaction ends, thereby producing a large amount of sludge. Such sludge has high iron content, and the treatment and disposal of the iron sludge has not been properly solved, which limits the application of this advanced oxidation technology in engineering practice.

For the treatment and disposal of the iron sludge, it must be first deeply dewatered to reduce the moisture content to below 60% so as to minimize the sludge volume. Although the sludge cake obtained from deep dewatering process can greatly facilitate subsequent treatment (including agricultural and landfill disposal), the large amount of organic matter and iron contained in the iron sludge cannot be effectively utilized in the above methods, resulting in waste of resources and inconsistence with today's concept of sustainable development. Therefore, the sludge pyrolysis technology that utilizes the organic matter in the sludge (e.g., converting the organic components in the sludge into combustible gas) has become a hot research topic.

The sludge pyrolysis technology is a technology in which the organic matter in the sludge is pyrolyzed by heating under the condition of no oxygen or oxygen deficiency (due to the thermal instability of the organic matter in the sludge), thereby converting the organic matter into flammable gases such as $H_2$, $CH_4$ and CO as well as tar and residue. Currently, the treatment and disposal of the residue mainly includes the application of building materials, ceramsite preparation and soil amendments. For example, Chinese Patent Application CN105384399A discloses a method for preparing building materials, and Chinese Patent Application CN107033918A discloses a method of preparing a soil amendment by pyrolysis of excess sludge and tea residue. For the pyrolysis residue of the iron sludge with high iron content (10% to 40%), such methods cannot effectively use the rich iron in the residue, and also ignore the synergistic effect of Fe and biochar on improving sludge dewaterability, resulting in waste of resources.

In summary, if the high content of the iron-containing sludge pyrolysis residue can be effectively utilized and the iron sludge pyrolysis residue is enabled to effectively condition the sludge through a certain method to replace some of the chemicals in the traditional advanced oxidation sludge conditioners, the sludge treatment and disposal can be formed into a sustainable development route of deep dewatering, sludge pyrolysis and sludge conditioning with the high iron content in the pyrolysis residue and the synergistic effect of Fe and biochar. The realization of this route will greatly reduce the daily transportation volume of the sludge cake and the purchase cost of the sludge conditioner in the sewage plants, and meanwhile, combustible gases generated from sludge pyrolysis can also be recycled as energy, which has great environmental significance.

SUMMARY

In view of the above-described defects or improvement requirements in the art, the present disclosure aims to provide a sludge composite conditioner based on iron-containing sludge pyrolysis residue as well as a preparation method and use thereof, in which through improvements of the subsequent overall treatment process, the reuse mode and specific reaction condition parameters (e.g., the temperature, time and the flow rate of the protective gas in the pyrolysis process, and relevant requirements of the formed sludge composite conditioner based on iron-containing sludge pyrolysis residue when used, such as the pH requirement, the order of addition of the reactants, and the stirring time) of the respective subsequent treatment process steps of the iron-containing sludge cake, the problem of sludge cake treatment and disposal the existing sludge treatment and disposal technology can be effectively solved compared with the prior art, and then the iron-containing sludge cake is utilized to form a composite conditioner for deep dewatering of sludge, which is recycled as a sludge conditioner for sludge treatment, thereby realizing the full utilization of resources; through optimal control of the ratio of the iron-containing sludge pyrolysis residue to the oxidant in the sludge composite conditioner based on iron-containing sludge pyrolysis residue, the sludge composite conditioner based on iron-containing sludge pyrolysis residue has better sludge conditioning effect.

In order to achieve the above objective, according to an aspect of the present disclosure, there is provided a sludge composite conditioner based on iron-containing sludge pyrolysis residue, comprising iron-containing sludge pyrolysis residue and an oxidant used in combination with the iron-containing sludge pyrolysis residue, in which the iron-containing sludge pyrolysis residue is pyrolysis residue obtained by dewatering iron-containing sludge to obtain an iron-containing sludge cake and then pyrolyzing the iron-containing sludge cake, the iron-containing sludge being obtained from an advanced oxidation technology involving an iron-containing reagent.

Preferably, the iron-containing reagent is a Fenton reagent, a Fenton-like reagent or a persulfate-ferrous salt combination reagent; the iron-containing sludge cake has a moisture content of 0 to 60%, and the iron-containing sludge cake has an iron content of 8% to 30% in dry basis; preferably, the iron-containing sludge is obtained by treating sludge with a Fenton compound conditioner.

Further preferably, the iron-containing sludge pyrolysis residue mainly comprises zero-valent iron, divalent iron compounds, trivalent iron compounds and biochar.

Further preferably, the oxidant is at least one of peroxide, persulfide and ozone; preferably, a mass ratio of the iron-containing sludge pyrolysis residue to the oxidant is (20 to 80):(3 to 10).

According to another aspect of the present disclosure, there is provided a preparation method for the above sludge composite conditioner based on iron-containing sludge pyrolysis residue, comprising:

(S11) treating sludge or sewage with an advanced oxidation technology involving an iron-containing reagent to obtain iron-containing sludge, and then dewatering the iron-containing sludge to obtain an iron-containing sludge cake;

(S12) subjecting the iron-containing sludge cake obtained in the step (S11) to pyrolysis treatment to obtain pyrolysis residue, i.e., iron-containing sludge pyrolysis residue; and (S13) compounding the iron-containing sludge pyrolysis residue obtained in the step (S12) with an oxidant to obtain a sludge composite conditioner based on iron-containing sludge pyrolysis residue.

Preferably, in the step (S12), the pyrolysis treatment is performed by pyrolyzing the iron-containing sludge cake under the atmosphere of protective gas at 600 to 1000° C. for 30 to 90 minutes; the protective gas is at least one of nitrogen gas and argon gas, and a flow rate of the protective gas is 0.1 to 0.3 L/min.

According to another aspect of the present disclosure, there is provided a preparation method for the above sludge composite conditioner based on iron-containing sludge pyrolysis residue, comprising:

According to still another aspect of the present disclosure, there is provided use of the above sludge composite conditioner based on iron-containing sludge pyrolysis residue as a sludge conditioner.

Preferably, the use comprises:

(S21) adjusting a pH of sludge to be treated to be 1 to 6.5;

(S22) adding the iron-containing sludge pyrolysis residue to the sludge obtained in the step (S21), and then performing stirring for 2 to 8 minutes; and (S23) adding the oxidant used in combination with the iron-containing sludge pyrolysis residue to the sludge obtained in the step (S22), and then performing stirring for 15 to 50 minutes, thereby obtaining conditioned sludge.

Further preferably, in the step (S21), the sludge to be treated has a moisture content of 90% to 99%; in the step (S21), the pH of the sludge to be treated is adjusted by adding acid; the acid is at least one of hydrochloric acid, sulfuric acid, nitric acid, oxalic acid and citric acid.

Further preferably, in the step (S22), an additive amount of the iron-containing sludge pyrolysis residue is 20% to 80% in sludge dry mass of the sludge to be treated; and in the step (S23), an additive amount of the oxidant is 3% to 10% in sludge dry mass of the sludge to be treated.

Compared with the prior art, in the above technical solution of the present inventive concept, the iron-containing sludge (for example, iron-containing sludge obtained from an advanced oxidation technology in the prior art) is pyrolyzed to obtain pyrolysis residue, and then the pyrolysis residue is combined with an oxidant to form a novel sludge advanced oxidation composite conditioner, which can be recycled for sludge conditioning. According to the sludge composite conditioner based on iron-containing sludge pyrolysis residue as well as a preparation method and use thereof in the present disclosure, the iron-containing sludge pyrolysis residue is reused to prepare an advanced oxidation composite conditioner for sludge deep dewatering. The treatment target of the present disclosure is directed to iron-containing sludge obtained from an advanced oxidation technology, for example, sludge conditioned by an advanced oxidation composite conditioner and then performing deep dewatering, and performs reuse disposal of the iron-containing sludge cake. The sludge composite conditioner based on iron-containing sludge pyrolysis residue in the present disclosure is an advanced oxidation composite conditioner, which can effectively improve the dewaterability of sludge, thereby facilitating the subsequent dewatering process of the sludge.

The difficulty of the present disclosure is to find a method for activating iron element in the iron-containing sludge effectively, so that the iron-containing sludge can be recycled again for sludge conditioning. Due to the fact that the treatment and disposal methods of iron sludge are mainly based on economical landfill and the resource utilization of iron sludge is difficult, less attention is paid to the utilization of high content of iron and organics in the iron-containing sludge. The disclosure utilizes reducing gases and biochar generated by the pyrolysis of the sludge itself as reducing agents to reactivate the iron in the iron-containing sludge, and through controlling parameters such as the temperature, pyrolysis time, pyrolysis atmosphere and gas flow of the sludge cake in the pyrolysis process, the resource utilization of the iron-containing sludge can be effectively realized with the overall cooperation of these parameters. The disclosure also preferably controls a series of parameter conditions when the iron-containing sludge pyrolysis residue and the oxidant are used together, so that the sludge composite conditioner based on iron-containing sludge pyrolysis residue has a conditioning effect equivalent to that of the traditional chemical conditioner, and thus has a good application prospect.

The sludge composite conditioner based on iron-containing sludge pyrolysis residue in the present disclosure has a conditioning effect equivalent to that of the traditional chemical conditioner. The iron element mainly exists in form of iron oxide, iron oxide hydroxide and amorphous iron hydroxide in the deeply dewatered sludge cake obtained from the advanced oxidation-conditioned sludge. In the pyrolysis process, the sludge organics are decomposed under an inert atmosphere to generate a large amount of reducing gases such as $CO$ and $H_2$, as shown in the reaction formula (1). After reaching a certain temperature, these reducing gases and the produced biochar are subjected to oxidation-reduction reaction with high-valent iron in the sludge cake to gradually generate ferroferric oxide, ferrous iron and zero-valent iron, as shown in the reaction formulas (2), (3) and (4)

$$\text{organic matter(s)} \rightarrow CO(g) + H_2(g) + CH_4(g) \quad (1)$$

$$Fe(III)(s) + CO/H_2/C(g) \rightarrow CO_2/CO/H_2O(g) + Fe_3O_4(s) \quad (2)$$

$$Fe_3O_4(s) + CO/H_2/C(g) \rightarrow CO_2/CO/H_2O(g) + Fe(II)(s) \quad (3)$$

$$Fe(II)(s) + CO/H_2/C(g) \rightarrow CO_2/CO/H_2O(g) + Fe(0)(s) \quad (4)$$

The iron-rich pyrolysis residue obtained after the pyrolysis of the sludge cake can leach a large amount of $Fe^{2+}$ under the acidic condition, as shown in the reaction formulas (5) and (6), and at the same time, due to the porous structure and the large specific surface area of the biochar, the surface of the biochar also adsorbs a certain amount of Fe(II). In the sludge conditioning process, the homogeneous reaction and the heterogeneous reaction work together to improve the advanced oxidation effect. Taking hydrogen peroxide as the oxidant as an example, the specific reaction process is as shown in the reaction formulas (7) and (8).

$$Fe_2O_3/Fe_3O_4 + H^+ \rightarrow Fe^{2+}/Fe^{3+} + H_2O \quad (5)$$

$$Fe(0) + H^+ \rightarrow Fe^{2+} + H_2 \quad (6)$$

$$Fe^{2+} + H_2O_2 \rightarrow Fe^{3+} + OH^- + \cdot OH \quad (7)$$

$$Fe(II) + H_2O_2 \rightarrow Fe(III) + OH^- + \cdot OH \quad (8)$$

In the present disclosure, parameters such as the temperature, time and protective gas flow rate of the iron-containing sludge cake in the pyrolysis process are controlled, so that the iron-containing sludge cake is pyrolyzed under the atmosphere of protective gas with a flow rate of 0.1 to 0.3 L/min at 600 to 1000° C. for 30 to 90 min, and through the overall cooperate of these reaction conditions, the iron element in the sludge cake is fully activated. When the sludge composite conditioner based on iron-containing sludge pyrolysis residue is used, it is necessary to adjust the pH of sludge to be treated to 1 to 6.5, so that the iron-containing sludge pyrolysis residue can leach a large amount of $Fe^{2+}$ under the acidic condition. In addition, the iron-containing sludge pyrolysis residue is first added, first stirring is performed, an oxidant is then added and second stirring is performed, in which way, the order of addition of the respective components of the composite conditioner and the two stirring operations are controlled so that the pyrolysis residue is fully reacted with the oxidant to optimize the sludge conditioning effect.

The above iron-containing sludge is pyrolyzed to obtain pyrolysis residue having high iron content, which is recycled for sludge conditioning to realize resource utilization. The reduced iron is obtained by high temperature pyrolysis, and is combined with sludge carbon to work together with the oxidant to participate in advanced oxidation reaction for sludge conditioning, thereby destroying sludge organic flocs and thus improving the sludge dewatering performance. The application method is simple in operation and obvious in effect, and closely combines sludge dewatering and sludge pyrolysis processes to form a sustainable development route of sludge dewatering, pyrolysis gas production and residue recycling while achieving the resource utilization of iron sludge. This route can greatly reduce the daily shipment volume of the sludge cake in the sewage plant, and saves the reagent purchase cost in the Fenton advanced oxidation process. Moreover, the synergistic effect of the respective components contained in the sludge composite conditioner based on iron-containing sludge pyrolysis residue makes the sludge composite conditioner have a significant sludge conditioning effect, which is of important environmental significance.

The iron-containing sludge pyrolysis residue utilized in the present disclosure can react with the oxidant in an acidic environment, and the advanced oxidation generated can destroy the organic hydrophilic structure of the extracellular polymer of the sludge. Moreover, Fe and biochar have a synergistic conditioning effect in the pyrolysis residue, in which the biochar has a strong adsorption effect to both iron ions and organic matters in sludge flocs, and iron ions adsorbed on the surface of the residue can destroy the absorbed organic matters through advanced oxidation reaction, thereby greatly improving the sludge dewatering performance. The present disclosure solves the problem of secondary pollution caused by a large amount of iron sludge discharge in the advanced oxidation technology, and meanwhile the obtained iron-containing sludge pyrolysis residue can be recycled for advanced oxidation conditioning of the sludge, thereby realizing the close combination of sludge advanced oxidation deep dewatering and the resource utilization of the deeply dewatered cake obtained from the advanced oxidation technology, which is of important environmental significance.

In the sludge composite conditioner based on iron-containing sludge pyrolysis residue according to the present disclosure, a ratio of the conditioning sludge pyrolysis residue (i.e., the iron-containing sludge pyrolysis residue) to the oxidant is preferably (20 to 80):(3 to 10). When the sludge composite conditioner is used to condition sludge to be treated, on the basis of the dry mass of the sludge to be treated, the addition amount of the conditioning sludge pyrolysis residue may be preferably controlled to 20% to 80% in sludge dry basis mass, and the addition amount of the oxidant may be preferably controlled to 3% to 10% in sludge dry basis mass (the oxidant may be added in the form of a solution, and at this time, the mass of the oxidant corresponds to the mass of the solute in the solution), thereby achieving an excellent sludge conditioning effect.

The main innovations of the method of the disclosure are summarized as follows.

1. The iron form in the pyrolysis residue is controlled by a pyrolysis method, thereby solving the problem of iron sludge treatment and disposal.

2. It is proposed for the first time that the iron sludge pyrolysis residue and the oxidant are combined to realize resource utilization of the iron sludge in the sludge conditioning. Due to the high iron content in the pyrolysis residue and the adsorption of biochar, the pyrolysis residue has a remarkable sludge conditioning effect, thereby achieving the purpose of waste disposal.

3. This technology combines the two processes of sludge dewatering and sludge pyrolysis to form a sustainable development route of sludge dewatering, sludge cake pyrolysis, pyrolysis residue reuse and sludge conditioning.

BRIEF DESCRIPTION OF THE DRAWINGS

FIGS. 3A and 3B are diagrams showing the phase and morphology of the iron-containing sludge pyrolysis residue, in which FIG. 3A is a XRD pattern of the iron-containing sludge pyrolysis residue, and FIG. 3B is an SEM image of the iron-containing sludge pyrolysis residue.

DETAILED DESCRIPTION OF THE EMBODIMENTS

Figure 1:
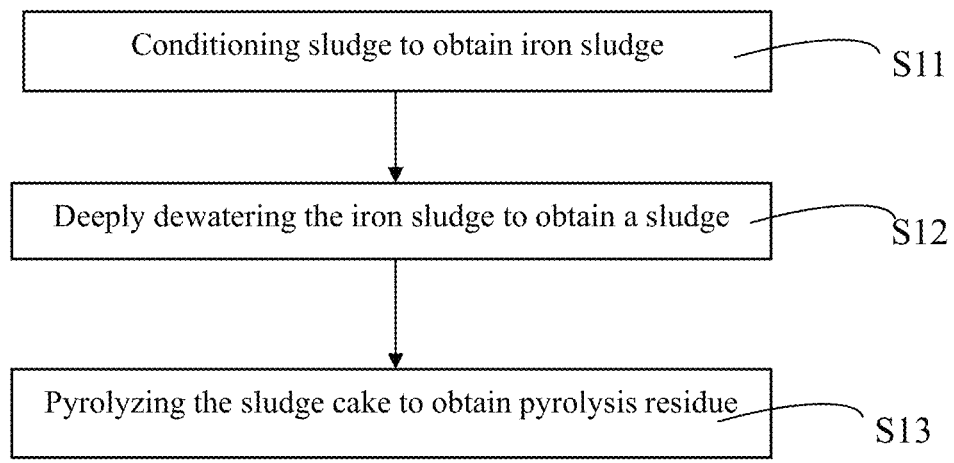
FIG. 1 is a schematic flowchart of a preparation process for iron-containing sludge pyrolysis residue.
Figure 2:
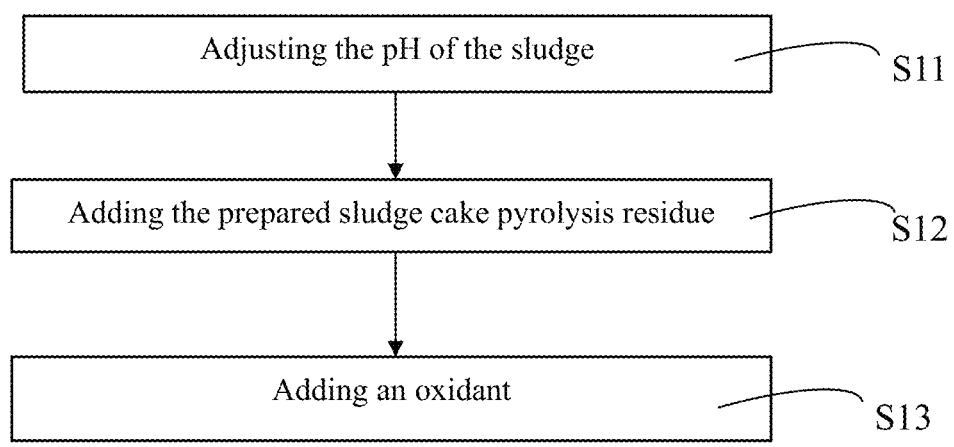
FIG. 2 is a schematic flowchart of a preparation process for the iron-containing sludge pyrolysis residue.
Figure 3A:
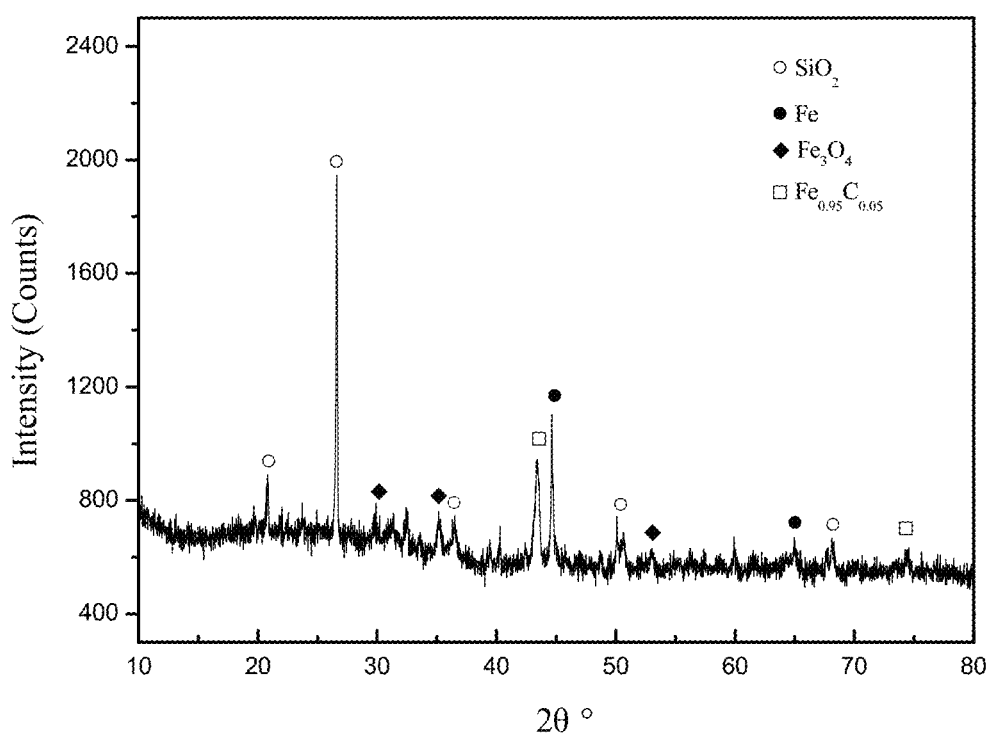
Figure 3B:
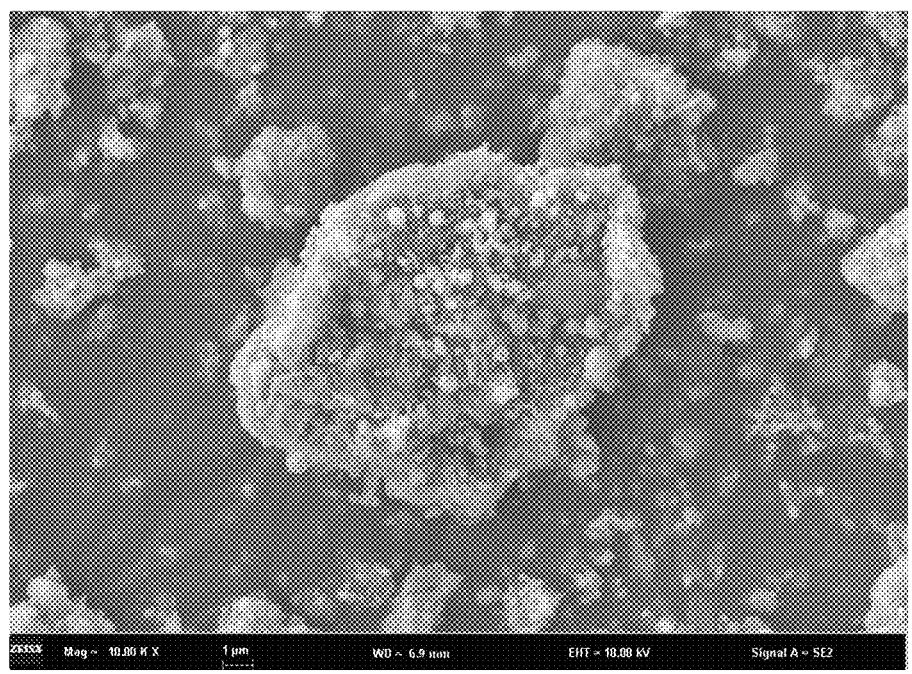

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

The disclosure is directed to iron-containing sludge generated by sludge or sewage treatment with an iron-containing conditioner (e.g., the advanced oxidation technology using Fenton reagent), and emphatically to an iron-containing sludge cake obtained by deep dewatering of sludge with the Fenton composite conditioner, in which the preparation process of the iron-containing sludge cake can be obtained by referring to, for example, the existing sludge dewatering composite conditioner and the application method thereof disclosed in the Chinese patent document CN102381828A to obtain a deeply dewatered sludge cake with a moisture content of 40% to 60% (the deeply dewatered sludge cake may also be dewatered to reduce the moisture content to 0 to 60%, for example, 10%). The deeply dewatered iron-containing sludge cake is pyrolyzed under an inert gas atmosphere, and the resulting residue is called iron-containing sludge pyrolysis residue. Pyrolysis gases and tar produced in the pyrolysis process can also be recycled as secondary fuel.

The present disclosure relates to a sludge composite conditioner based on iron-containing sludge pyrolysis residue as well as a preparation method and use thereof, belonging to a method for recycling iron-containing sludge, in which a sludge deep dewatering conditioner for sludge conditioning can be obtained by a pyrolysis method, the preparation method of the iron-containing sludge pyrolysis residue comprising:

Step S11: preparing a deeply dewatered sludge cake with a moisture content of 40% to 60% by using the Fenton or Fenton-like reagent and the skeleton builder (referring to the sludge conditioning method disclosed in Chinese Patent Application CN102381828A).

In one embodiment, the used transition metal salt is a ferrous salt, the used free radical generator is hydrogen peroxide, and the used skeleton builder is red mud.

Step S12: feeding the prepared deeply dewatered sludge cake into a pyrolysis furnace, and performing sludge pyrolysis under an inert atmosphere to obtain iron-containing sludge pyrolysis residue.

In the step S12, the inert gas may be at least one of nitrogen gas and argon gas, and the flow rate of the inert gas may be 0.1 to 0.3 L/min; the pyrolysis temperature may be 600° C. to 1000° C., and the pyrolysis time may be 30 min to 90 min.

In the step S12, in addition to the iron-containing sludge pyrolysis residue, pyrolysis gases and tar may be generated in the pyrolysis process of the sludge cake, and these pyrolysis gases and tar can also be recycled as secondary fuel.

An application method of the prepared iron-containing sludge pyrolysis residue comprises the following steps:

Step S21: adjusting a pH of the surplus sludge to be treated to 1 to 6.5 with an acid. The used acid may be one of sulfuric acid, hydrochloric acid and nitric acid (of course, other acids such as oxalic acid and citric acid may also be used to satisfy the pH).

Step S22: adding the above pyrolysis residue to the sludge, the additive amount being 20% to 80% in sludge dry basis; and then performing a stirring operation. The stirring rate may be, for example, 120 to 200 rpm, and the stirring time may be, for example, 2 to 8 minutes.

Step S23: adding an oxidant to the sludge, the additive amount being 3% to 10% in sludge dry basis; and then performing a stirring operation. The stirring rate may be, for example, 70 to 120 rpm, and the stirring time may be, for example, 15 to 50 minutes.

In the preparation and application methods of the above-mentioned iron sludge pyrolysis residue, the iron-containing sludge is pyrolyzed to obtain residue with high iron content, and then the residue is used to replace the originally purchased ferrous salt in the conventional advanced oxidation process for sludge conditioning, which not only solves the problem of the treatment and disposal of a large amount of iron-containing sludge, but also combines sludge dewatering and sludge pyrolysis processes to form a sustainable development route of sludge dewatering, pyrolysis gas production and residue recycling.

The following are specific embodiments:

Embodiment 1

In the present embodiment, preparation and application methods of the iron-containing sludge pyrolysis residue are as follows.

(1) 17 kg of sludge and 128.2 g of $FeSO_4 \cdot 7H_2O$ were respectively added to a sludge conditioning tank, and stirring was performed at a stirring rate of 150 rpm and a stirring time of 5 min; then, 104.9 mL of 30% hydrogen peroxide was added, and stirring was performed at a stirring rate of 100 rpm and a stirring time of 30 min to allow the oxidant to fully react with the sludge; finally, 166 g of red mud was added, and rapid stirring was performed for conditioning at a stirring rate of 150 rpm and a stirring time of 5 min. In the above red mud, the percentage of iron is 26%, the mass percentage of aluminum oxide is 18%, the mass percentage of titanium oxide is 6%, and the mass percentage of silica and other minerals is 50%. Finally, 17.4 kg of conditioning sludge was obtained.

(2) The conditioning sludge was dewatered with a plate and frame filter press. 17.4 kg of conditioning sludge was firstly pumped into a 50 L sludge feed tank by a pump, and then the conditioning sludge in the sludge feed tank was pressed into a diaphragm plate frame by a pneumatic press to be dewatered. In order to squeeze the sludge, the pressure of the pneumatic press was increased to 0.8 MPa at a rate of 0.1 MPa/min and kept for 25 min; and then the pressure was increased to 1.2 MPa at a rate of 0.1 MPa/min and kept for 25 min. Finally, 1.08 kg of deeply dewatered sludge cake with a moisture content of 52% can be obtained, and the iron content of the sludge cake was tested to be 18.35% (the iron content is measured in sludge cake dry basis, and specifically, a part of sludge cake is dried and then measured).

(3) The obtained sludge cake was dried, and placed in an oven at 105° C. for 24 h, thereby obtaining 518.4 g of absolute-dried sludge cake.

(4) The absolute-dried sludge cake was pyrolyzed by using a horizontal tube pyrolysis furnace. Nitrogen was introduced at 0.3 L/min to discharge air in the system, 30 g of the absolute-dried sludge cake as pyrolysis material was placed the furnace, and the temperature was raised to 800° C. at a heating rate of 10° C./min and then kept for 90 min, thereby obtaining pyrolysis residue.

(5) 200 g of sludge with a water content of 97% was placed in a beaker (the dry mass of the sludge is 6 g), and the pH of the sludge was adjusted to 2 with a 30% sulfuric acid solution; 1.3 g of the above residue was added to the sludge, and then stirring is performed at a stirring rate of 150 rpm and a stirring time of 5 min; 2 mL of 30% hydrogen peroxide was added, and then stirring was performed at a stirring rate of 100 rpm and a stirring time of 30 min, thereby obtaining residue conditioned sludge.

The capillary sop time (CST) and the specific resistance to filtration (SRF) of the conditioned sludge in the present embodiment are shown in Table 1.

Embodiment 2

In the present embodiment, preparation and application methods of the iron-containing sludge pyrolysis residue are as follows.

(1) 17 kg of sludge and 58.57 g of $FeCl_2$ were respectively added to a sludge conditioning tank, and stirring was performed at a stirring rate of 150 rpm and a stirring time of 5 min; then, 104.9 mL of 30% hydrogen peroxide was added, and stirring was performed at a stirring rate of 100 rpm and a stirring time of 30 min to allow the oxidant to fully react with the sludge; finally, 15 g of quick lime was added, and rapid stirring was performed for conditioning at a stirring rate of 150 rpm and a stirring time of 5 min. Finally, 17.3 kg of conditioning sludge was obtained.

(2) The conditioning sludge was dewatered with a plate and frame filter press. 17.3 kg of conditioning sludge was firstly pumped into a 50 L sludge feed tank by a pump, and then the conditioning sludge in the sludge feed tank was pressed into a diaphragm plate frame by a pneumatic press to be dewatered. In order to squeeze the sludge, the pressure of the pneumatic press was increased to 0.8 MPa at a rate of 0.1 MPa/min and kept for 25 min; and then the pressure was increased to 1.2 MPa at a rate of 0.1 MPa/min and kept for 25 min. Finally, 1.11 kg of deeply dewatered sludge cake with a moisture content of 55% can be obtained, and the iron content of the sludge cake was tested to be 11.35%.

(3) The deeply dewatered sludge cake was pyrolyzed by using a horizontal tube pyrolysis furnace. Nitrogen was introduced at 0.1 L/min to discharge air in the system, 30 g of the sludge cake with a moisture content of 55% as pyrolysis material was placed in the furnace which has been heated to 900° C., and heat preservation was performed for 30 min to obtain pyrolysis residue.

(4) 200 g of sludge with a water content of 97.3% was placed in a beaker (the dry mass of the sludge is 5.4 g), and the pH of the sludge was adjusted to 4 with a 30% sulfuric acid solution; 4.3 g of the above residue was added to the sludge, and then stirring is performed at a stirring rate of 150 rpm and a stirring time of 2 min; 0.54 mL of 30% hydrogen peroxide was added, and then stirring was performed at a stirring rate of 100 rpm and a stirring time of 50 min, thereby obtaining residue conditioned sludge.

The capillary sop time (CST) and the specific resistance to filtration (SRF) of the conditioned sludge in the present embodiment are shown in Table 1.

Embodiment 3

In the present embodiment, preparation and application methods of the iron-containing sludge pyrolysis residue are as follows.

(1) 15.4 kg of sludge and 73.92 g of $FeCl_2$ were respectively added to a sludge conditioning tank, and stirring was performed at a stirring rate of 150 rpm and a stirring time of 5 min; then, 154.1 mL of 30% hydrogen peroxide was added, and stirring was performed at a stirring rate of 100 rpm and a stirring time of 30 min to allow the oxidant to fully react with the sludge. Finally, 15.4 kg of conditioning sludge was obtained.

(2) The conditioning sludge was dewatered with a plate and frame filter press. 15.4 kg of conditioning sludge was firstly pumped into a 50 L sludge feed tank by a pump, and then the conditioning sludge in the sludge feed tank was pressed into a diaphragm plate frame by a pneumatic press to be dewatered. In order to squeeze the sludge, the pressure of the pneumatic press was increased to 0.8 MPa at a rate of 0.1 MPa/min and kept for 25 min; and then the pressure was increased to 1.2 MPa at a rate of 0.1 MPa/min and kept for 25 min. Finally, 1.03 kg of deeply dewatered sludge cake with a moisture content of 43% can be obtained, and the iron content of the sludge cake was tested to be 8.35%.

(3) The obtained sludge cake was dried. The sludge cake was placed in a ventilated place for 24 h to obtain 763.46 g of sludge cake with a moisture content of 23.1%.

(4) The dried sludge cake was pyrolyzed by using a horizontal tube pyrolysis furnace. Nitrogen was introduced at 0.12 L/min to discharge air in the system, 30 g of the sludge cake with a moisture content of 23.1% as pyrolysis material was placed in the furnace which has been heated to 600° C., and heat preservation was performed for 60 min to obtain pyrolysis residue.

(5) 200 g of sludge with a water content of 95.2% was placed in a beaker (the dry mass of the sludge is 9.6 g), and the pH of the sludge was adjusted to 1 with a 30% sulfuric acid solution; 7 g of the above residue was added to the sludge, and then stirring is performed at a stirring rate of 150 rpm and a stirring time of 8 min; 2.4 mL of 30% hydrogen peroxide was added, and then stirring was performed at a stirring rate of 100 rpm and a stirring time of 40 min, thereby obtaining residue conditioned sludge.

The capillary sop time (CST) and the specific resistance to filtration (SRF) of the conditioned sludge in the present embodiment are shown in Table 1.

Embodiment 4

In the present embodiment, preparation and application methods of the iron-containing sludge pyrolysis residue are as follows.

(1) 15.4 kg of sludge and 177.42 g of $FeSO_4.7H_2O$ were respectively added to a sludge conditioning tank, and stirring was performed at a stirring rate of 150 rpm and a stirring time of 5 min; then, 144.8 mL of 30% hydrogen peroxide was added, and stirring was performed at a stirring rate of 100 rpm and a stirring time of 30 min to allow the oxidant to fully react with the sludge; finally, 256 g of red mud was added, and rapid stirring was performed for conditioning at a stirring rate of 150 rpm and a stirring time of 5 min. In the above red mud, the percentage of iron is 36%, the mass percentage of aluminum oxide is 18%, the mass percentage of titanium oxide is 6%, and the mass percentage of silica and other minerals is 40%. Finally, 15.8 kg of conditioning sludge was obtained.

(2) The conditioning sludge was dewatered with a plate and frame filter press. 15.8 kg of conditioning sludge was firstly pumped into a 50 L sludge feed tank by a pump, and then the conditioning sludge in the sludge feed tank was pressed into a diaphragm plate frame by a pneumatic press to be dewatered. In order to squeeze the sludge, the pressure of the pneumatic press was increased to 0.8 MPa at a rate of 0.1 MPa/min and kept for 25 min; and then the pressure was increased to 1.2 MPa at a rate of 0.1 MPa/min and kept for 25 min. Finally, 1.05 kg of deeply dewatered sludge cake with a moisture content of 49% can be obtained, and the iron content of the sludge cake was tested to be 27.35%.

(3) The obtained sludge cake was dried. The sludge cake was placed in a ventilated place for 12 h to obtain 800.45 g of sludge cake with a moisture content of 33.1%.

(4) The dried sludge cake was pyrolyzed by using a horizontal tube pyrolysis furnace. Nitrogen was introduced at 0.3 L/min to discharge air in the system, 30 g of the sludge cake with a moisture content of 33.1% as pyrolysis material was placed in the furnace which has been heated to 1000° C., and heat preservation was performed for 90 min to obtain pyrolysis residue.

(5) 200 g of sludge with a water content of 96.4% was placed in a beaker (the dry mass of the sludge is 7.2 g), and the pH of the sludge was adjusted to 6.5 with a 10% hydrochloric acid; 5.7 g of the above residue was added to the sludge, and then stirring is performed at a stirring rate of 200 rpm and a stirring time of 2 min; 2.1 mL of 30% hydrogen peroxide was added, and then stirring was performed at a stirring rate of 150 rpm and a stirring time of 15 min, thereby obtaining residue conditioned sludge.

The capillary sop time (CST) and the specific resistance to filtration (SRF) of the conditioned sludge in the present embodiment are shown in Table 1.

In addition to existing advanced oxidation technologies such as a Fenton oxidation method (i.e., using a Fenton reagent) and a Fenton-like oxidation method (i.e., using a Fenton-like reagent), the present disclosure is also applicable to iron-containing sludge obtained by other existing advanced oxidation technologies such as a method using persulfate-ferrous salt combination reagent, as long as an advanced oxidation conditioner containing iron is used in the advanced oxidation technology. In the present disclosure, an oxidant that combines with the iron-containing sludge pyrolysis residue to form a sludge composite conditioner may be at least one of peroxide, persulfide and ozone, and of course, two or more types of oxidants may be used at the same time. In the present disclosure, an existing pyrolysis furnace such as a horizontal tubular pyrolysis furnace or a vertical tubular pyrolysis furnace may be used in the sludge cake pyrolysis process.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A method, comprising:
   dewatering an iron-containing sludge, that includes organic matter, to obtain an iron-containing sludge cake;
   performing a pyrolysis treatment by pyrolyzing the iron-containing sludge cake, under an atmosphere of a protective gas at 600 to 1000° C. for 30 to 90 minutes, and the protective gas comprises at least one of nitrogen gas and argon gas, to obtain an iron-containing sludge pyrolysis residue that includes zero-valent iron, divalent iron compounds, trivalent iron compounds, and biochar;

TABLE 1

| | Sludge conditioner | Pyrolysis temperature (° C.) | Pyrolysis time (min) | Moisture content of pyrolysis material (%) | Conditioned sludge CST (s) | Conditioned sludge SRF ($10^{13}$ m/kg) |
|---|---|---|---|---|---|---|
| Embodiment 1 | Fenton + red mud | — | — | — | 36.4 | 0.306 |
| Embodiment 1 | Residue + oxidant | 800 | 90 | 0 | 28.35 | 0.253 |
| Embodiment 2 | Fenton + lime | — | — | — | 35.7 | 0.311 |
| Embodiment 2 | Residue + oxidant | 900 | 30 | 55 | 60.1 | 0.564 |
| Embodiment 3 | Fenton | — | — | — | 41.1 | 0.472 |
| Embodiment 3 | Residue + oxidant | 600 | 60 | 23.1 | 78.2 | 0.713 |
| Embodiment 4 | Fenton + red mud | — | — | — | 29.2 | 0.266 |
| Embodiment 4 | Residue + oxidant | 1000 | 90 | 33.1 | 44.1 | 0.502 |

It can be seen from Table 1 that conditioning effects (sludge dewatering performance) of the conditioning sludge pyrolysis residue in Embodiments 1-4 are equivalent to that of the methods in which ferrous salt is added, proving that the iron element in the sludge cake can be effectively activated by high temperature pyrolysis in a protective atmosphere and is subjected to advanced oxidation reaction with the oxidant to achieve good sludge conditioning. The method has simple operation and obvious effect, and at the same time allows the sludge treatment and disposal to form a sustainable development route of sludge dewatering, sludge pyrolysis and residue recycling.

adjusting a pH of a first sludge to be 1 to 6.5 to obtain a first treated sludge;
adding the iron-containing sludge pyrolysis residue to the first treated sludge, and stirring for 2 to 8 minutes to obtain a second treated sludge; and
adding a first oxidant to the second treated sludge, and stirring for 15 to 50 minutes, to obtain a conditioned sludge.

2. The method according to claim 1, wherein the first sludge has a moisture content of 90 to 99%;
the pH is adjusted by adding an acid to the first sludge; and the acid is selected from the group consisting of hydrochloric acid, sulfuric acid, nitric acid, oxalic acid, citric acid, and combinations thereof.

3. The method according to claim 1, wherein the iron-containing sludge pyrolysis residue is added at an amount of 20 to 80% of a dry mass of the first sludge; and the first oxidant is added at an amount of 3 to 10% of the dry mass of the first sludge.

4. The method according to claim 1, wherein the iron-containing sludge is obtained by treating a sewage or a second sludge with an iron-containing reagent and a second oxidant.

5. The method according to claim 1, wherein the iron-containing sludge is obtained by treating a sewage or a second sludge with a Fenton reagent or a reagent containing persulfate and ferrous salt.

6. The method according to claim 1, wherein, before pyrolysis, the iron-containing sludge cake has a moisture content of 0 to 60% and an iron content of 8% to 30% relative to a dry mass of the iron-containing sludge cake.

7. The method according to claim 1, wherein the first oxidant is selected from the group consisting of peroxide, persulfide, ozone, and a combination thereof, and a mass ratio of the iron-containing sludge pyrolysis residue to the first oxidant is 20 to 80:3 to 10.

8. The method according to claim 1, wherein the protective gas is provided at a flow rate of 0.1 to 0.3 L/min.

* * * * *